(No Model.)
W. H. & A. M. CURRY.
INSECT PROOF ROLLER OR PEDESTAL.
No. 589,465. Patented Sept. 7, 1897.
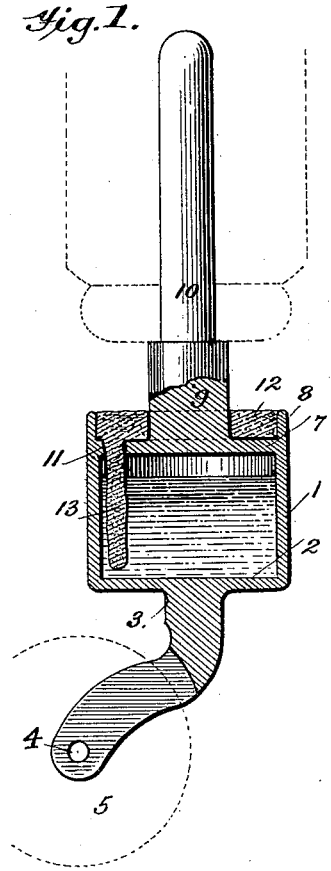
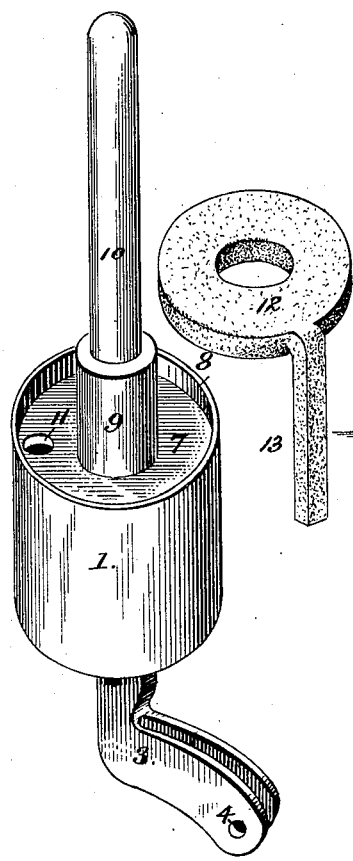
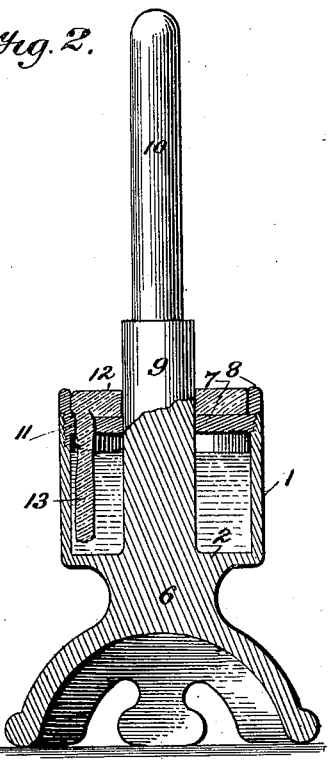
WITNESSES:
J. Edw Luckett
Louis Dieterich
INVENTORS
W. H. Curry
A. M. Curry
BY
Fred G. Dieterich & Co.
ATTORNEYS
THE NORRIS PETERS CO., PHOTO-LITHO., WASHINGTON, D. C.

UNITED STATES PATENT OFFICE.

WILLIAM HENRY CURRY AND AMEY MARSHALL CURRY, OF PIONEER, TEXAS.

INSECT-PROOF ROLLER OR PEDESTAL.

SPECIFICATION forming part of Letters Patent No. 589,465, dated September 7, 1897.

Application filed February 24, 1897. Serial No. 624,869. (No model.)

*To all whom it may concern:*

Be it known that we, WILLIAM HENRY CURRY and AMEY MARSHALL CURRY, residing at Pioneer, in the county of Eastland and State of Texas, have invented a new and Improved Insect-Proof Roller or Pedestal, of which the following is a specification.

Our invention is in the nature of a caster or pedestal for beds, sofas, tables, &c.; and it primarily has for its object to provide an article of this character having means for destroying chinches and other insects or vermin, whereby to prevent same from passing up the post or leg into the bed, sofa, or table.

Our invention also has for its object to provide a caster or pedestal of the kind stated of a very simple and inexpensive construction which is capable of being fitted to the post or table-leg in the ordinary manner, which has a neat and ornamental appearance, and which will effectively serve for its intended purpose.

With other objects in view, which will hereinafter appear, the invention consists in a device of the character stated embodying the peculiar combination and novel arrangement of parts, such as will be first described in detail, and then be specifically pointed out in the appended claims, reference being had to the accompanying drawings, in which—

Figure 1 is a vertical section of the preferred form of caster. Fig. 2 is a similar view of a modified form of our invention. Fig. 3 is a perspective view of the caster-body, the absorbent disk being shown detached.

In its practical construction our invention consists of a hollow body 1, preferably cylindrical in shape and of a suitable width and height, such body in the preferred form, as shown in Fig. 1, having integrally connected therewith a pendent bifurcated arm 3, apertured at the end, as at 4, for the pintles of the caster-roller 5.

While our device is more especially designed for use as a caster for beds and tables, it may be provided with a solid base or pedestal 6, as shown in Fig. 2.

In the form shown in Fig. 3 the top 7 of the body 1 has an annular projecting rim 8, in practice about one-fourth of an inch in height, and a central base 9, which extends about three-fourths of an inch above the said top 7 and terminates in a shank 10, having a length and diameter of the common caster or bed-roller. The top 7 has an aperture 11 near the rim 8, through which the coal-oil or other exterminating fluid is poured into the hollow body 1.

12 indicates a disk composed of cotton, flannel, or other absorbent material, which is formed with a lateral extension, which is bent down to form a wick 13, adapted to pass down through the hole 11 into the fluid, as clearly shown in Fig. 1, such wick portion serving to draw the oil or other fluid up to the disk and saturate the same.

Instead of forming the caster or pedestal in the manner shown in Fig. 2 the same may be made as shown in Fig. 3, such latter construction being especially adapted when the device is used as a pedestal for heavy tables. In such construction the base extends up from the bottom 2 up above the upper edge of the holder 1, while the top and rim portion is made detachable and secured to the body 1 by the thread connections shown.

From the foregoing description, taken in connection with the drawings, it is thought the advantages of our invention will be apparent. As the absorbent pad or disk is at the top of the holder 1, it is manifest that the chinches and other insects as they crawl up the caster or pedestal must pass over the saturated disk to reach the central hub, which disk, however, they will not engage on account of its odor.

By arranging the pad or disk on top of the holder and providing it with a pendent wick it is obvious the same can be easily raised when it is desired to refill the holder.

Having thus described our invention, what we claim, and desire to secure by Letters Patent, is—

1. A caster or pedestal, having a fluid-holding chamber, between its base and shank portions, and an absorbent or oil-receiving member covering the top of the holder and surrounding the shank, and having a portion projected into the fluid within the holder, as specified.

2. A caster or pedestal, having a fluid-holding chamber at a point between the base and the shank, said holder having an annular rim at the top, and an opening in such top, and a disk or pad of an absorbent material detachably held within the said rim to surround the shank, having a pendent wick adapted to pass down through the top of the holder as set forth.

3. The combination of the base having a shank projected up from the bottom, a fluid-holding chamber surrounding the lower end of the shank, a top having an annular vertical rim and an aperture, said top being detachably connected to the upper end of the fluid-holding chamber, and a disk of absorbent material detachably held on such top, having an extension adapted to be bent down to pass through the aperture in the said top, all substantially as described.

WILLIAM HENRY CURRY.
AMEY MARSHALL CURRY.

Witnesses:
MC. RICHARDSON,
C. BROWNING.